UNITED STATES PATENT OFFICE.

CHARLES FRIES, OF NEW YORK, N. Y.

PIGMENT.

SPECIFICATION forming part of Letters Patent No. 358,926, dated March 8, 1887.

Application filed May 28, 1886. Serial No. 203,499. (Specimens.)

*To all whom it may concern:*

Be it known that I, CHARLES FRIES, a citizen of the United States, residing at New York city, State of New York, have invented new and useful Improvements in Pigments, of which the following is a specification.

My invention relates to a new article of manufacture—to wit, a pigment or coloring-matter—to be used as a paint, particularly useful for both outdoor and indoor work, and utilizing a material heretofore regarded as worthless for such purposes—to wit, the "slag" or refuse of cinnabar ore.

In the ordinary operations of extracting the mercury from cinnabar ore, slag or residuum remains which is of no commercial value and is thrown away. This I take and subject to thorough washing to remove soluble earthy impurities. Next, after drying I grind the product into a fine powder, and during the grinding process incorporate with the same a sufficient quantity of tallow or other oily vehicle to produce a pasty or oily mass of the required consistence to be packaged, in the same manner as "white lead" or similar basis for paints. The resulting product is of a beautiful "sienna" tint, and possesses all the qualities of body, &c., desirable in a first-class paint. The kyanizing effect of mercury is not present, or to only a limited degree, and in this respect the product differs essentially from that which is the subject of my application No. 190,376, heretofore filed, which is for a grade of "vermilion" paint involving the presence of mercury.

The apparatus required in the production is of no special character, any suitable form of grinding apparatus being applicable.

The body thus produced is thinned for use with the ordinary solvents, and used with the brush in the usual manner. It may be used both for indoor and outdoor work, and is distinguished by its strong tone in color (sienna-brown) and its unchangeable durability. The paint so produced is, moreover, practically fire-proof—that is, possesses an extraordinary power of resisting heat.

I claim as my invention and desire to secure by Letters Patent of the United States—

As a new article of manufacture, a pigment for use as a paint, (sienna-brown,) consisting of the slag or residuum of cinnabar ore purified and ground with a suitable vehicle, substantially as set forth.

In testimony whereof I have hereunto set my hand in the presence of two subscribing witnesses.

CHARLES FRIES.

Witnesses:
   I. ALBERT ENGLEHART,
   JOSEPH WAMSLEY.